US011140074B2

(12) United States Patent
Filsfils et al.

(10) Patent No.: US 11,140,074 B2
(45) Date of Patent: Oct. 5, 2021

(54) COMMUNICATING PACKETS ACROSS MULTI-DOMAIN NETWORKS USING COMPACT FORWARDING INSTRUCTIONS

(71) Applicant: Cisco Technology, Inc., San Jose, CA (US)

(72) Inventors: Clarence Filsfils, Brussels (BE); Francois Clad, Strasbourg (FR); Zafar Ali, Hicksville, NY (US); Peter Psenak, Bratislava (SK)

(73) Assignee: Cisco Technology, Inc., San Jose, CA (US)

( * ) Notice: Subject to any disclaimer, the term of this patent is extended or adjusted under 35 U.S.C. 154(b) by 171 days.

(21) Appl. No.: 16/580,944

(22) Filed: Sep. 24, 2019

(65) Prior Publication Data

US 2021/0092053 A1 Mar. 25, 2021

(51) Int. Cl.
*H04L 12/721* (2013.01)
*H04L 29/06* (2006.01)
*H04L 12/715* (2013.01)

(52) U.S. Cl.
CPC .............. *H04L 45/34* (2013.01); *H04L 45/04* (2013.01); *H04L 69/22* (2013.01)

(58) Field of Classification Search
CPC ..... H04L 45/50; H04L 61/2592; H04L 45/34; H04L 45/12; H04L 61/305; H04L 61/2007; H04L 47/125; H04L 61/6059; H04L 47/34; H04L 45/42; H04L 67/141; H04L 45/00; H04L 45/741; H04L 45/121; H04L 45/02; H04L 45/04; H04L 45/302
See application file for complete search history.

(56) References Cited

U.S. PATENT DOCUMENTS

| | | | |
|---|---|---|---|
| 2020/0153732 A1* | 5/2020 | Negi | H04L 47/34 |
| 2020/0228446 A1* | 7/2020 | Geng | H04L 69/22 |
| 2020/0296025 A1* | 9/2020 | Wang | H04L 12/4641 |
| 2021/0083973 A1* | 3/2021 | Peng | H04L 45/32 |
| 2021/0083975 A1* | 3/2021 | Chunduri | H04L 45/34 |
| 2021/0084009 A1* | 3/2021 | Du | H04L 61/6086 |

* cited by examiner

*Primary Examiner* — Jung Liu
(74) *Attorney, Agent, or Firm* — Lee & Hayes, P.C.

(57) ABSTRACT

Techniques and mechanisms for compressing the size of SIDs to be smaller than a complete IPv6 address (or "micro SIDs"), and scaling micro SIDs across a multi-domain environment using micro SID-domain-blocks. Segment routing over IPv6 (SRv6) uses 128-bit IPv6 addresses as SIDs for segment routing. According to this disclosure, multiple SRv6 SIDs may be expressed in a compact format such that a 128-bit IPv6 address, such as the destination address field of the IPv6 header, may store multiple micro SIDs. Further, SID-domain-blocks may be assigned to each domain in a multi-domain network such that micro SIDs may be expressed in the context of a given domain, rather than being shared in the global multi-domain network. In this way, lists of domain-specific SIDs may be fully expressed in the IPv6 destination address of the packet to scale micro SID into large, multi-domain networks.

20 Claims, 6 Drawing Sheets

┌─────────────────────────────────────────────────────────────────────┐
│ RECEIVING AN INTERNET PROTOCOL VERSION 6 (IPV6) PACKET HAVING AN IPV6 │
│ HEADER INCLUDING A DESTINATION ADDRESS FIELD THAT IS POPULATED WITH A │
│ FIRST DESTINATION ADDRESS THAT INCLUDES A FIRST SID-DOMAIN-BLOCK     │
│ ASSIGNED TO A FIRST DOMAIN, A FIRST SID CORRESPONDING TO A FIRST    │
│ NETWORK NODE IN THE FIRST DOMAIN, AND A SECOND SID CORRESPONDING TO A │
│ SECOND NETWORK NODE IN A SECOND DOMAIN                               │
│ 402                                                                  │
└─────────────────────────────────────────────────────────────────────┘
                                  ↓
┌─────────────────────────────────────────────────────────────────────┐
│ MODIFYING, BASED AT LEAST IN PART ON AN INSTRUCTION, THE FIRST      │
│ DESTINATION ADDRESS TO RESULT IN A SECOND DESTINATION ADDRESS        │
│ INCLUDING A SECOND SID-DOMAIN-BLOCK ASSIGNED TO THE SECOND DOMAIN AND │
│ THE SECOND SID CORRESPONDING TO THE SECOND NETWORK NODE              │
│ 404                                                                  │
└─────────────────────────────────────────────────────────────────────┘
                                  ↓
┌─────────────────────────────────────────────────────────────────────┐
│ SENDING, FROM THE FIRST NETWORK NODE, THE IPV6 PACKET HAVING THE IPV6 │
│ HEADER INCLUDING THE DESTINATION ADDRESS FIELD POPULATED WITH THE    │
│ SECOND DESTINATION ADDRESS                                           │
│ 406                                                                  │
└─────────────────────────────────────────────────────────────────────┘

```
DETERMINING TO SEND AN INTERNET PROTOCOL VERSION 6 (IPV6) PACKET
FROM A SOURCE NODE IN A FIRST DOMAIN TO AT LEAST A SECOND DOMAIN OF A
MULTI-DOMAIN NETWORK
502
```

```
POPULATING A DESTINATION ADDRESS FIELD OF THE IPV6 PACKET WITH A
DESTINATION ADDRESS THAT INCLUDES A FIRST SID-DOMAIN BLOCK ASSIGNED
TO THE FIRST DOMAIN, A FIRST SID CORRESPONDING TO A FIRST NODE LOCATED
IN THE FIRST DOMAIN, AND A SECOND SID CORRESPONDING TO A SECOND NODE
LOCATED IN THE SECOND DOMAIN
504
```

```
SENDING, FROM THE SOURCE NODE, THE IPV6 PACKET TO THE FIRST NODE IN
THE FIRST DOMAIN TO BE FORWARDED ONTO THE SECOND NODE
506
```

COMMUNICATING PACKETS ACROSS MULTI-DOMAIN NETWORKS USING COMPACT FORWARDING INSTRUCTIONS

TECHNICAL FIELD

The present disclosure relates generally to routing packets through multi-domain networks using domain-specific, micro-segment routing instructions.

BACKGROUND

In computer networking, many technologies exist for devices to route data packets through networks. For example, routers and switches in many Internet Protocol (IP) networks utilize routing tables, or a set of rules, that list routes to particular network destinations and are used to determine where data packets are to be directed. Internet Protocol networks rely on the destination IP address to forward packets based on the content of routing tables that are populated in advance by routing protocols (e.g., OSPF, IS-IS, etc.). However, in IP networks, each device in a path of a data packet has to make independent routing decisions where the data packet is stored in the data plane of each router, and to find the next hop for the data packet, each router has to check the routing table in the control plane and change the destination MAC of the packet. Thus, each hop in the path of a data packet must analyze the entire IP header to determine the next hop, which is a time-consuming process and increases network latency.

Segment routing has been introduced as a flexible, scalable way of doing source routing where the source device chooses a path and encodes it in the packet header as an ordered list of segments. Segment routing divides a network into "segments" where each node and link in the network can be assigned a segment identifier, or an "SID," which gets advertised by each node using standard routing protocol extensions (IS-IS/OSPF or BGP), thereby eliminating the need to run additional label distribution protocols. Thus, routers in a segment router network do not require Label Distribution Protocol (LDP) and Resource Reservation Protocol-Traffic Engineering (RSVP-TE) to allocate or signal their SIDs and program their forwarding information. In segment routing, the source device chooses a path and encodes it in the packet header as an ordered list of segments where each segment is an identifier for a particular type of instruction. Rather than having to set up a forwarding path that is maintained by all nodes in a path, segment routing encodes the instruction, called a segment, into the packet and intermediate nodes forward the packet based on these instructions, thereby removing state from the network and reducing signaling overhead.

Segment Routing has been used over the Internet Protocol version 6 (IPv6) data plane (hereinafter "SRv6") where the SIDs are encoded as IPv6 addresses. An ordered list of segments is encoded as an ordered list of IPv6 addresses, and the active segment to process is in the destination address field of the IPv6 header. After completion of a segment, the next segment is copied in the IPv6 destination address header from a location in a Segment Routing Header (SRH) indicated by an index (or "Segments Left") in the SRH and the index value is decremented. The SID in SRv6 may represent a 128-bit structure consisting of two parts, the locator and the function. The locator may represent an address of a particular SRv6 node or segment, and the function is any type of function bound to the SRv6 SID that is executed locally on a particular node. After the node executes the function for a particular SID, the node decrements the Segments Left value in the SRF and copies the next segment into the IPv6 destination address field where the index in the segment list is indicated by the Segments Left value. Thus, nodes can simply perform the forwarding instructions in the stack of SIDs provided in the data packet, thereby steering data packets through an engineered path in the network independently of the IGP shortest paths and without introducing per-flow state at any intermediate router. Rather, the intermediate routers execute instructions in the segment list without requiring any knowledge of the end-to-end path or its intent. While segment routing is advantageous for various reasons including those described herein, segment routing may still suffer from some inefficiencies.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes techniques for routing packets through multi-domain networks using domain-specific, micro-segment routing instructions. A method performed by a first network node located in a first domain of a multi-domain network to perform techniques described herein includes receiving an Internet Protocol version 6 (IPv6) packet having an IPv6 header including a destination address field that is populated with a first destination address. In some examples, the first destination address may include a first segment identifier (SID)-domain-block assigned to the first domain, a first SID corresponding to the first network node, and a second SID corresponding to a second network node located in a second domain of the multi-domain network. Further, the first SID may be associated with an instruction to change the first SID-domain-block to a second SID-domain-block assigned to the second domain in which the second network node is located. Further, the method may include modifying, by the first network node and based at least in part on the instruction, the first destination address to result in a second destination address. The second destination address may include the second SID-domain-block assigned to the second domain, and the second SID corresponding to the second network node. Finally, the method may include sending, from the first network node, the IPv6 packet having the IPv6 header including the destination address field populated with the second destination address.

Additionally, the techniques described herein may be performed by a system and/or device having non-transitory computer-readable media storing computer-executable instructions that, when executed by one or more processors, performs the method described above.

Example Embodiments

Generally, segment routing over IPv6 (hereinafter "SRv6") comprises a technique of performing source routing where the source device selects a path over a network and places an ordered list of segment identifiers (hereinafter "SIDs") into a header of the IPv6 packet. The SIDs may comprise 128-bit IPv6 addresses that are placed into the header of the IPv6 packet where each IPv6 address indicates a locator, or an address of a particular SRv6 node or segment, and a function that is bound to the SID and is to be executed locally on a particular node. Thus, a source device can specify the path through the network that an IPv6 packet is to traverse using a listing of SIDs in a segment routing extension header (SRH) of the header of the IPv6 packet. However, listing the SIDS in the SRH of the IPv6 packet may require that intermediate nodes along the defined path be able to read deep enough into the packet to process the addresses in the SRH. While this is not an issue for high-end routers, many network processing units (NPUs) have limited reading capability into a packet, which may result in the intermediate routers being unable to read deep enough into the packet header and being forced to drop the packet (or punt it for software "slow-path" switching). Even if the intermediate nodes are able to read deep enough into the packet, the intermediate nodes may do so at the expense of recycling the packet, thereby suffering forwarding degradation.

This disclosure describes techniques and mechanisms for compressing the size of SIDs to be smaller than a complete IPv6 address (referred to herein as "micro SIDs" or "compressed SIDs"), and scaling the use of micro SIDs across a multi-domain environment using micro SID-domain-blocks. As noted above, SRv6 has traditionally used 128-bit IPv6 addresses as SIDs for segment routing. According to the techniques described herein, multiple SRv6 SIDs may be expressed in a compact format such that a 128-bit IPv6 address, such as the destination address field of the IPv6 header may store multiple compact or micro SIDs. Further, the techniques described herein include assigning SID-domain-blocks to each domain in a multi-domain network such that micro SIDs may be expressed in the context of a given domain, rather than being shared in the global multi-domain network. In this way, whole SID lists may be fully expressed in the IPv6 destination address of the packet, which enables SRv6 use-cases on medium-end routers that may not be able to read deep enough in the packet to process a Segment Routing Header (SRH).

In some examples, to express the SIDs in a compact format, a source router may populate the most significant bits in the IPv6 destination address field with a pre-defined value, called a micro-SID-block, which indicates that the following information is a list of micro SIDs. The concatenated list of micro SIDs is then encoded in the remaining bits of the IPv6 destination address field with each micro SID being expressed over a few bits instead of an entire 128-bit address. However, due to the limited number of bits in each micro SID, only a limited set of instructions is available for a network. For instance, a micro SID length of 16 bits provides 65,536 micro SID values and, with a micro SID block of 16 bits, up to 7 micro SIDs can be included in one 128-bit IPv6 address. While this is a lot of SIDs, this may be insufficient for large-scale, multi-domain deployments with hundreds of thousands or even millions of nodes.

In order to address the scaling issue of micro SIDs in a multi-domain environment, the techniques described herein describe micro SID-domain-blocks that are assigned to each domain in the multi-domain network. Rather than using the same SID-block across the whole multi-domain network, a sub-block of the global micro SID-block may be assigned for each domain. For example, domain 1 could have the micro SID-domain-block of "FE01::/16," and domain 2 could have the micro SID-domain-block of "FE02::/16," and so on. As an example, out of a global micro SID-block of 16 bits, 8 bits allocated for the domain would allow the identification of up to 256 domains. Following the above example, if there are 256 possible micro SID-blocks and the SIDs each have a length of 16 bits, more than 16 million micro SIDs would be available globally.

While utilizing per-domain SID blocks helps with scalability, using multiple micro SID-domain-blocks can increase IP header overhead. According to the techniques described herein, a block swapping mechanism may be introduced to switch from one domain context to another, thus enabling inter-domain segment routing policies to be expressed within a single IPv6 address. Specifically, the block swapping mechanism may be implemented as a new type of micro SID instruction whose behavior is the replacement of the current micro SID-domain-block with a specific new micro SID-domain-block. The block swapping micro SIDs can have a global or local scope and be advertised in the routing protocol of all connected domains. The IPv6 prefixes corresponding to these domain-swapping micro SIDs may be advertised by the domain border nodes into their connected domains (e.g., as anycast prefixes). For example, if the micro SID-domain-blocks are "FE01" to "FEFF," then the micro SIDs "0x0001" to "0x00FF" may be advertised and reserved in each domain for domain swapping SIDs.

Accordingly, a source node may determine a path for a data packet to reach its destination through multiple domains of a multi-domain network. The source node may include a current micro SID-domain-block followed by a list of SIDs for nodes/links in that domain that the packet is to traverse. As each SID instruction is executed by a node, the SID is removed from the IPv6 header. The source node may populate the IPv6 header with block swapping SIDs such that, when the data packet reaches a border node (or a node with reachability into the next domain), the border node may execute the block swapping SID to replace the current SID-domain-block with the SID-domain-block for the next domain the data packet is to traverse. In this way, the block swapping mechanism may enable assigning of SIDs to nodes and links that are domain-specific in order to reduce the size of SIDs from 128-bits to a lower value, and to also address scalability issues for large, multi-domain networks where limited availability of SIDs would traditionally have been an issue.

Although the techniques described herein are primarily with reference to IPv6, the techniques are generally applicable to any type of protocol, implemented at any layer, that may be used for segment routing using lists of SIDs. (e.g., MPLS). Similarly, the techniques may be applied for source routing between various types of nodes such as links, hardware devices, virtual resources (e.g., virtual machines, containers, etc.) running on devices, and/or any combination thereof. While the techniques are described with reference to the destination address header of IPv6 packets, the techniques are equally applicable to type of header or extension usable for segment routing and any type of packets used for segment routing.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
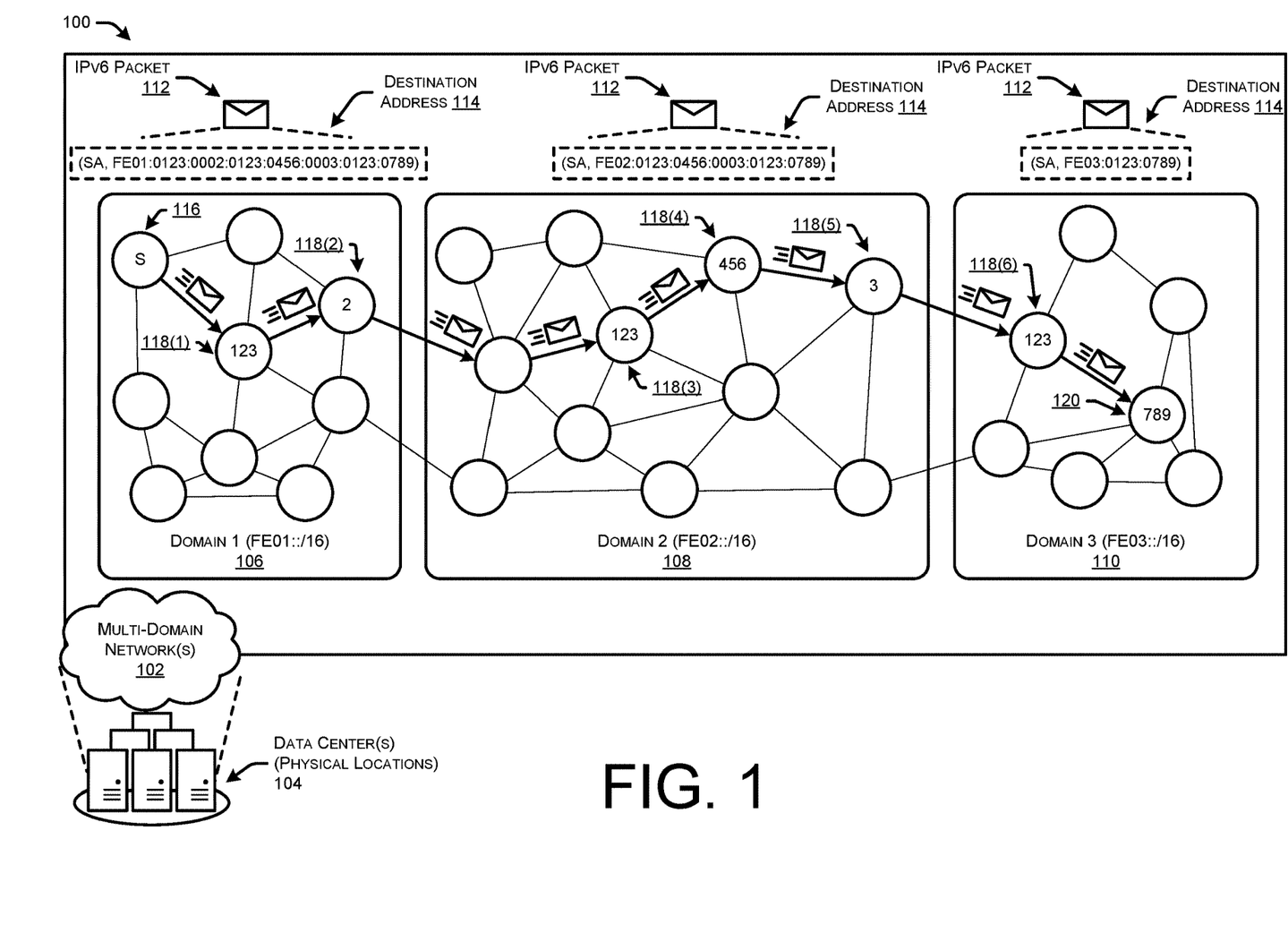
FIG. 1 illustrates a system-architecture diagram of an example multi-domain network in which a source device generates an IPv6 packet that is forwarded by intermediary devices onto a destination device using domain-specific, micro-segment routing instructions.

FIG. 1 illustrates a system-architecture diagram 100 of an example multi-domain network 102 in which a source device generates an IPv6 packet that is forwarded by intermediary devices onto a destination device using domain-specific, micro-segment routing instructions.

In some examples, one or more multi-domain network(s) 102 may be supported by devices that are housed or located in one or more data centers 104 (or other physical locations). The multi-domain networks 102 may include one or more networks implemented by any viable communication technology, such as wired and/or wireless modalities and/or technologies. The multi-domain network 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The multi-domain network 102 may include devices, virtual resources, or other nodes that relay packets from one network segment to another by nodes in the computer network. The multi-domain network 102 may include multiple devices that utilize the network layer (and/or session layer, transport layer, etc.) in the OSI model for packet forwarding, and/or other layers.

Generally, a multi-domain network 102 may include multiple domains. As described herein, a network domain may comprise an administrative grouping of multiple computer networks or hosts within a same infrastructure. Each domain can be identified using a domain name, and may be assigned a micro SID-domain-block identifier as described herein. The domains may be accessible from the public Internet, and may be assigned a globally unique name within the Domain Name System (DNS). In some examples, a domain controller may automate various administrative duties for the domain, such as acting as a DNS server, managing logins, user groups, and the overall architecture of the domain.

The one or more data centers 104 may be physical facilities or buildings located across geographic areas that designated to store networked devices that are part of the multi-domain network 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. In some examples, the data centers 104 (physical and/or virtual) may provide basic resources such as processor (CPU), memory (RAM), storage (disk), and networking (bandwidth). However, in some examples the devices in the packet-forwarding networks 102 may not be located in explicitly defined data centers 104, but may be located in other locations or buildings.

The multi-domain network 102 may include any type of networking device, such as servers, switches, routers, hubs, bridges, gateways, modems, repeaters, access points, etc. As illustrated, the multi-domain network 102 may be utilized to transmit, route, forward, or otherwise send a data packet, such as an IPv6 packet 112, to a destination device based on a destination address 114 in the IPv6 packet 112. In some instances, a source device 116 may determine to transmit the IPv6 packet 112 across the multi-domain network 102. For instance, a client device may have communicated a request to the source device 116 to utilize a service, application, etc., that is provided by or accessible to the destination device. The source device 116 may populate the IPv6 header with a destination address 114 in order to route the IPv6 packet 112 through the multi-domain network 102.

As noted above, the source device 116 may designate the path that the IPv6 packet is to traverse to the destination using a segment routing protocol over the IPv6 data plane (e.g., SRv6). Rather than using 128-bit IPv6 addresses for the SIDs in the segment routing path, the source device 116 may utilize micro SIDs to define the segment routing path. As described herein, a micro SID may comprise any number of bits that is less than a complete IPv6 address, such as the IPv6 prefix. The micro SID may be defined as having any particular value depending on the design of the multi-domain network 102, and implementation preference. In some examples, a micro SID may have a length of 16 bits as noted above.

Each micro SID may be associated with a locator and a function such that intermediary nodes in the path execute the function to, for example, forward the IPv6 packet 112 onto the next node or segment in the micro SID listing. Because micro SIDs are smaller than traditional SIDs for IPv6, a single 128-bit destination address header may be populated with multiple micro SIDs, thereby defining the segment routing path using less room in the header of the IPv6 packet 112.

To notify the intermediary nodes/devices 118 in the routing path that the destination address 114 includes a listing of micro SIDs, the source device 116 may populate the most significant bits in the destination address field of the IPv6 packet 112 with a pre-defined value, called a micro-SID-block, which indicates that the following information is a list of micro SIDs.

The concatenated list of micro SIDs is then encoded in the remaining bits of the IPv6 destination address field with each micro SID being expressed over a few bits instead of an entire 128-bit address. However, due to the limited number of bits in each micro SID, only a limited set of instructions is available for a network. For instance, a micro SID length of 16 bits provides 65,536 micro SID values and, with a micro SID block of 16 bits, up to 7 micro SIDs can be included in one 128-bit IPv6 address. While this is a lot of SIDs, this may be insufficient for large-scale, multi-domain deployments with hundreds of thousands or even millions of nodes.

However, to scale micro SIDs in the multi-domain network 102, the source device 116 may utilize micro SID-domain-blocks that are assigned to each domain in the multi-domain network 102. Rather than using the same SID-block across the whole multi-domain network, a sub-block of the global micro SID-block may be assigned for each domain. For example, domain 1 106 in the multi-domain network may be assigned the micro SID-domain-block of "FE01::/16," domain 2 108 may be assigned the micro SID-domain-block of "FE02::/16," and domain 3 110 may be assigned the micro SID-domain-block of "FE03::/16." Accordingly, when the source device 116 populates the destination address 114 with the list of micro SIDs which define the routing path for the IPv6 packet 112, the source device 116 may utilize a block swapping mechanism to swap SID-domain-blocks in the destination address 114. For instance, a micro SID may be associated with a function for swapping the SID-domain-block corresponding to when the IPv6 packet 112 is to cross domains in the multi-domain network 102.

Thus, the source device 116, may determine the path for the IPv6 data packet 112 to traverse to reach a destination device 120 through multiple domains (e.g., 106, 108, and 110) of the multi-domain network 102. The source device 116 (or node) may include a current micro SID-domain-block (e.g., FE01::/16 for domain 1 106) followed by a list of SIDs for nodes/links in domain 1 106 that the packet 112 is to traverse.

An example destination address 114 is illustrated in FIG. 1 as including a source address of the source device 116, and the following destination address 114 "FE01:0123:0002: 0123:0456:0003:0123:0789." It is to be understood that the following example is merely illustrative of the techniques described herein, and the numbering and syntax is merely for illustrative purposes. After the source device 116 generate the IPv6 packet 112, the IPv6 packet 112 is send to the intermediary node 118(1) according to the micro SID instruction included in the destination address 114. The intermediary node 118(1) then processes the IPv6 packet in domain 1 106 as per the micro SID instruction bound to the micro-segment "0x0123" and forwards the IPv6 packet 112 onto the intermediary node 118(2) that is the closest border router. The IPv6 packet 112 is forwarded to the border router 118(2) as "FE01:0002:0123:0456:0003:0123:0789:0" because the "0x123" micro SID has been processed.

The border router 118(2) may then process the IPv6 packet 112 in domain 1 106, and may perform an instruction for block swapping that is bound to the "0x002" instruction processed by the border router 118(2). The "0x002" may cause the border router 118(2) to perform block swapping for the destination address 114, resulting in a destination address 114 of "FE02:0123:0456:0003:0123:0789::", and forwards the WO packet. 112 onto a border router in domain 2 108.

Once in domain 2 108, the IPv6 packet 112 is processed as per the instruction bound to the micro SID of "0x0123" in the domain 2 108 (which is different from instruction 0x0123 in domain 1 106). After processing the instruction bound to the micro SID of "0x0123" in domain 2 108, the IPv6 packet is forwarded as "SA, FE02:0456:0003:0123: 0789," Where ""SA" is the source address of the IPv6 packet, whatever the value may be. Similarly, the IPv6 packet 112 is then processed by intermediary node 118(4) according to the instruction bound to the assigned micro SID of "0x0456" in the domain 2 108. The intermediary node 118(4) may forward the IPv6 packet 112 onto a closest border router 118(5) to domain 2 with the designation address 114 of "SA, FE02:0003:0123:0789::."

The border router 118(5) may then execute the instruction that is bound to the micro SID "0x0003" in domain 2 108, which may be to perform the micro SID-domain-block swapping instruction. After executing the domain swapping instruction bound to the micro SID "0x0003," the border router 118(5) may forward the IPv6 packet 112 as "SA, FE03:0123:0789::" into domain 3 110. In domain 3 110, the IPv6 packet 112 is processed by the intermediary node 118(6) according to the instruction bound to the micro SID of "0x0123" in domain 3 110 (which is different form instructions "0x0123" in domain 1 106 and domain 2 108), which may cause the intermediary node 118(6) to forward the IPv6 packet 112 with a header of "SA, FE03:0789::." Finally, the destination device 120 may receive the IPv6 packet 112 and determine, based on the "0x0789" micro SID, that the WO packet 112 is intended to reach the destination device 120. In some examples, the destination device 120 may determine to analyze the payload of the IPv6 packet 112 based on the packet 112 being intended to reach the destination device 120. The destination device 120 may then perform the appropriate action based on at least the payload of the IPv6 packet 112.

As shown in the above illustrative example, a source device 116 may designate a segment routing path using micro SIDs that are placed in a destination address 114 of an IPv6 packet 112. The instructions bound to one or more of the micro segments may cause certain intermediary nodes 118 (e.g., nodes 118(2) and 118(5)) to perform block swapping techniques. The block swapping techniques may cause certain intermediary nodes 118 to swap the SID-domain-block listed in the most significant bits of the destination address 114 from a current SID-domain-block to a target SID-domain-block for a domain in Which the IPv6 packet 112 is about to enter. However, the SID-domain-block may populate any bit in the destination address 114, in some examples, and not necessarily the most significant bit.

It should be appreciated that the SIDs discussed herein may comprise prefix SIDs which may comprise SIDs that contain an IP address prefix calculated by an IGP in the service provider core network associated with the multi-domain network 102. The prefix SIDs may be globally unique to the multi-domain network 102. Further, the micro SIDs described here may include adjacency SIDs that contains an advertising router's adjacency to a neighbor. Generally, an adjacency SID may comprise a link between two routers and, because adjacency SIDs are relative to a specific router, adjacency SIDs are locally unique.

Generally, the size of the micro SIDs and the size of the SID-domain-block may be specified by a manager of the multi-domain network 102, and/or specified by the SRv6 protocol. Although illustrated as physical devices, in some examples, the source device 116, intermediary devices 118, and/or the destination device 120 may comprise virtual resources or virtual nodes in the packet-forwarding network 102.

Figure 2:
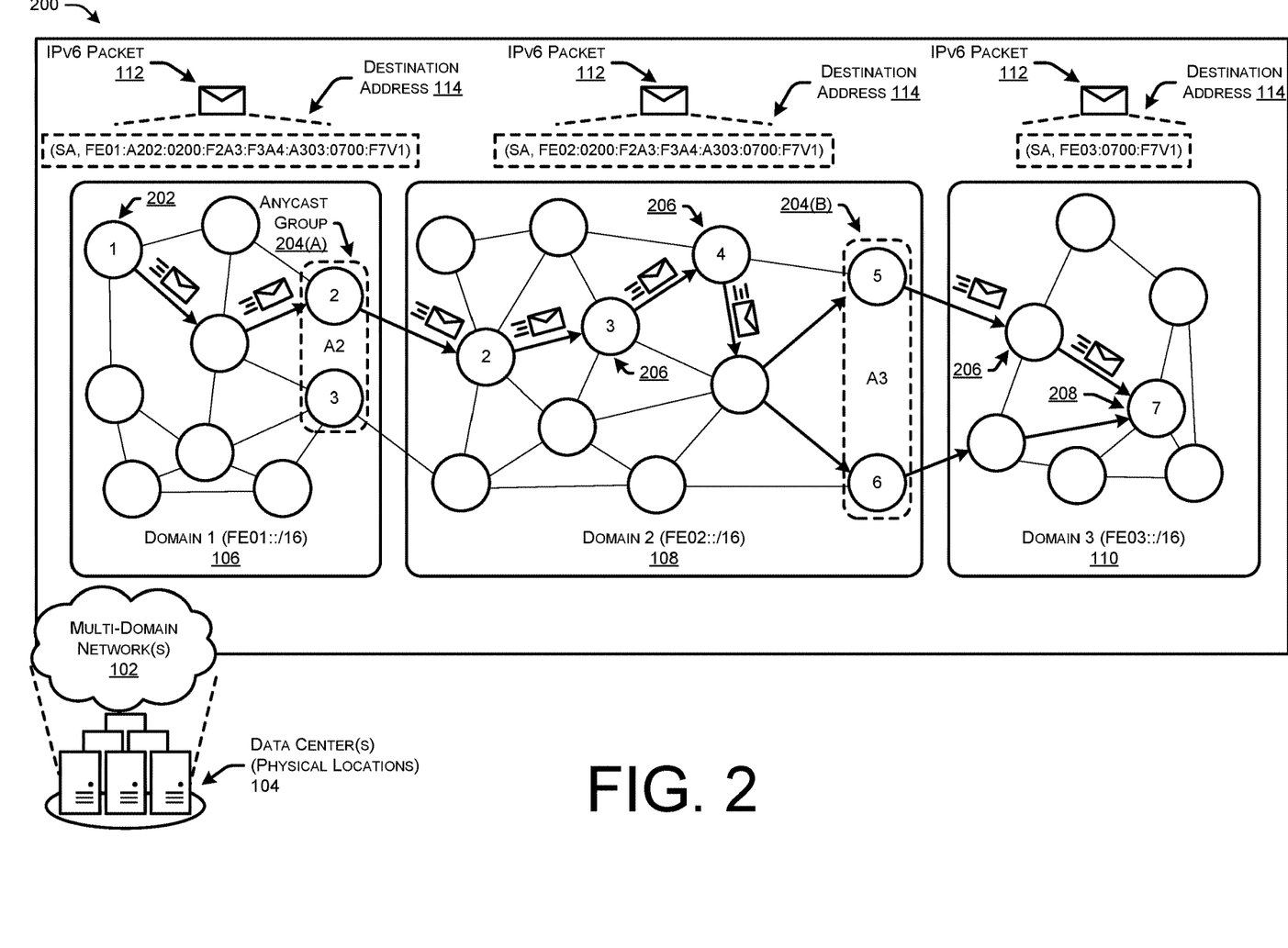
FIG. 2 illustrates a system-architecture diagram of an example multi-domain network in which a source device generates an IPv6 packet that is forwarded by intermediary devices included in anycast groups onto a destination device using domain-specific, micro-segment routing instructions.

FIG. 2 illustrates a system-architecture diagram 200 of an example multi-domain network in which a source device generates an IPv6 packet that is forwarded by intermediary devices included in anycast groups onto a destination device using domain-specific, micro-segment routing instructions.

In some examples, the principle of anycast groups may be utilized to steer traffic along a multi-domain path. For instance, a source device 202 may determine a path through a multi-domain network 102 and populate an IPv6 packet 112 with a destination address 114 that includes micro SIDs for anycast groups. As illustrated, the initial destination address 114 may be "SA, FE01:A202:0200:F2A3:F3A4: A303:0700:F7V1" when the source device 202 populates the destination address field of the IPv6 packet 112. As the IPv6 packet 112 traverses the path defined by the destination address, the IPv6 packet 112 will be delivered to the "closest" node in the anycast group 204(A), or load-balanced among the set of nodes at the closest distance, according to the principles of anycast routing.

As illustrated, the IPv6 packet 112 has a destination address 114 that includes the micro SID "A202" which corresponds to anycast group 204(A). The IPv6 packet 112 is routed to the closest node ("2") in the anycast group 204(A), which then performs the micro SID instruction for block swapping associated with the "A202" micro SID. The IPv6 packet 112 may have the SID-domain-block swapped at router "2" in the anycast group 204(A), and be sent into domain 2 108 with the destination address 114 of "FE02: 0200:F2A3:F3A4:A303:0700:F7V1:0." The IPv6 packet 112 is then routed through intermediate routers 206 in domain 2 108 according to the micro SIDs in domain 2 108 until it reaches the closest node in the anycast group 204(B). For instance, the micro SID may cause the IPv6 packet 112 to be steered to node "5" in the anycast group 204(B) based on the micro SID "A303." Node 5 in the anycast group 204(B) may then execute the micro SID instruction "A303" which is to perform block swapping to steer the IPv6 packet 112 into domain 3 110. The node 5 in anycast group 204(B) may perform the block swapping instruction such that the destination address 114 of the IPv6 packet 112 is "FE03: 0700:F7V1::" such that the IPv6 packet 112 is steered through nodes and links of domain 3 110 to the destination device 208.

Figure 3:
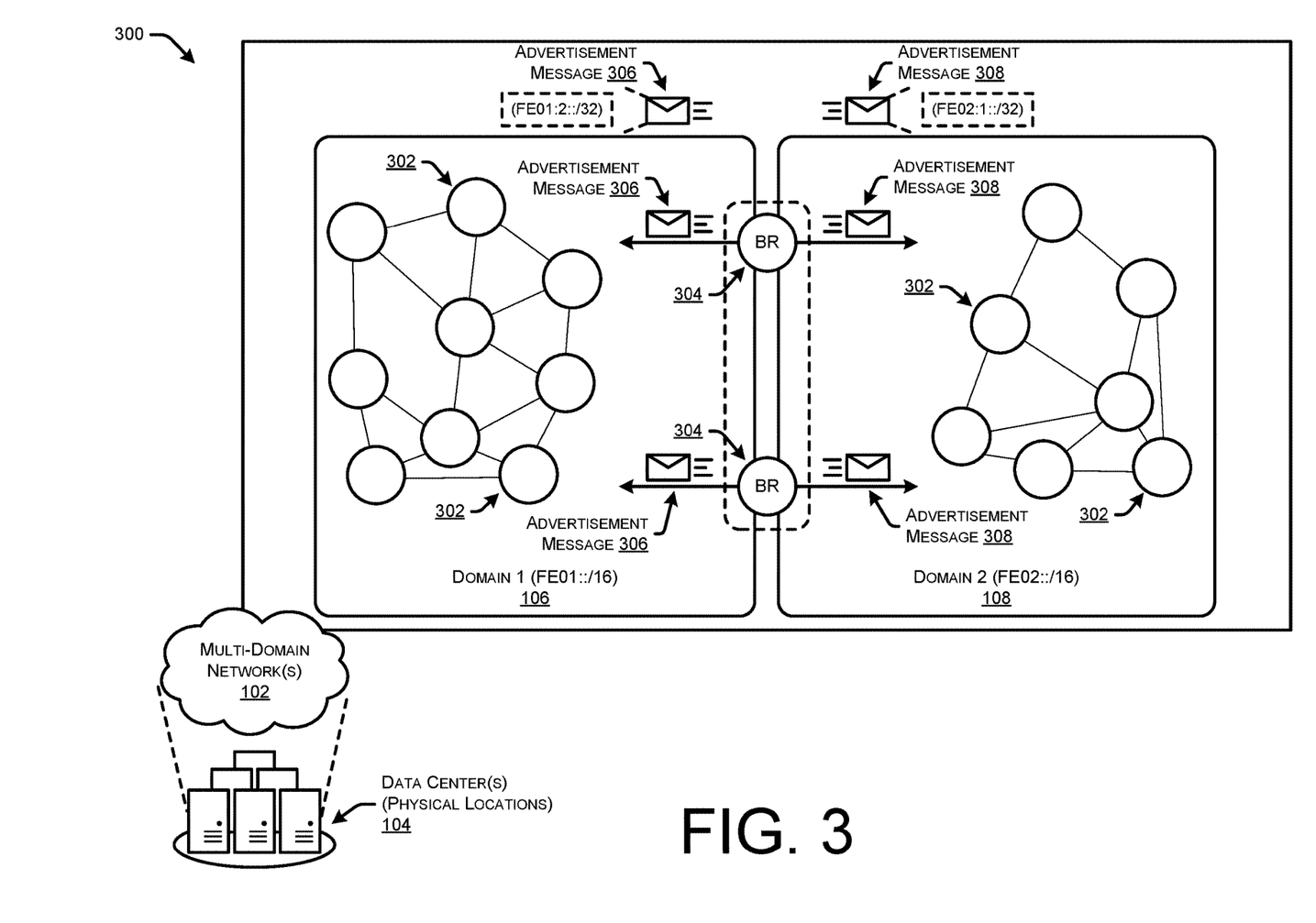
FIG. 3 illustrates a system-architecture diagram of an example multi-domain network in which border nodes in a multi-domain network advertise block swapping micro SIDs in the routing protocol into the connected domains.

FIG. 3 illustrates a system-architecture diagram 300 of an example multi-domain network 102 in which border nodes in the multi-domain network 102 advertise block swapping micro SIDs in the routing protocol into the connected domains.

As illustrated in FIG. 3, domain 1 106 and domain 2 108 may include multiple nodes 302, which may comprise source nodes 102 or intermediary nodes 102 to be used segment routing paths. As illustrated, one or more border routers 304 may send advertisement messages 306 and 308 into the domains that they border. The advertisement messages 306 may advertise a block swapping micro SID, which may have a global or a local scope. The advertisement messages 306 may be advertised in the routing protocol of all the connected domains.

As illustrated, advertisement message 306 may indicate the domain swapping instruction to the nodes 302 to enable the nodes 302 to be able to reach the domain 2 108 by including the domain swapping instruction in their IPv6 headers. For instance, the advertisement message 306 may indicate the block swapping instruction of "FE01:0002::/32" for the nodes 302 in domain 1 106 to insert into IPv6 packet 112 headers to enable block swapping for the IPv6 packet 112 to reach domain 2 108. Similarly, the border routers 304 may transmit advertisement message(s) 308 into domain 2 108 that indicate the block swapping instruction of "FE02: 1:132" for the nodes 302 in domain 2 108 top insert into IPv6 packet 112 headers to enable block swapping for the IPv6 packet 112 to reach domain 1 106. In this way, the nodes 302 in each domain may receive advertisement messages 306/308 that indicate the block swapping instruction (e.g., micro SID) to be placed into IPv6 packet 112 headers (e.g., destination address field, destination header extension, etc.). in some examples the nodes 304 need not necessarily be border nodes 304, but may simply be nodes that have reachability into the target domains.

Figure 4:
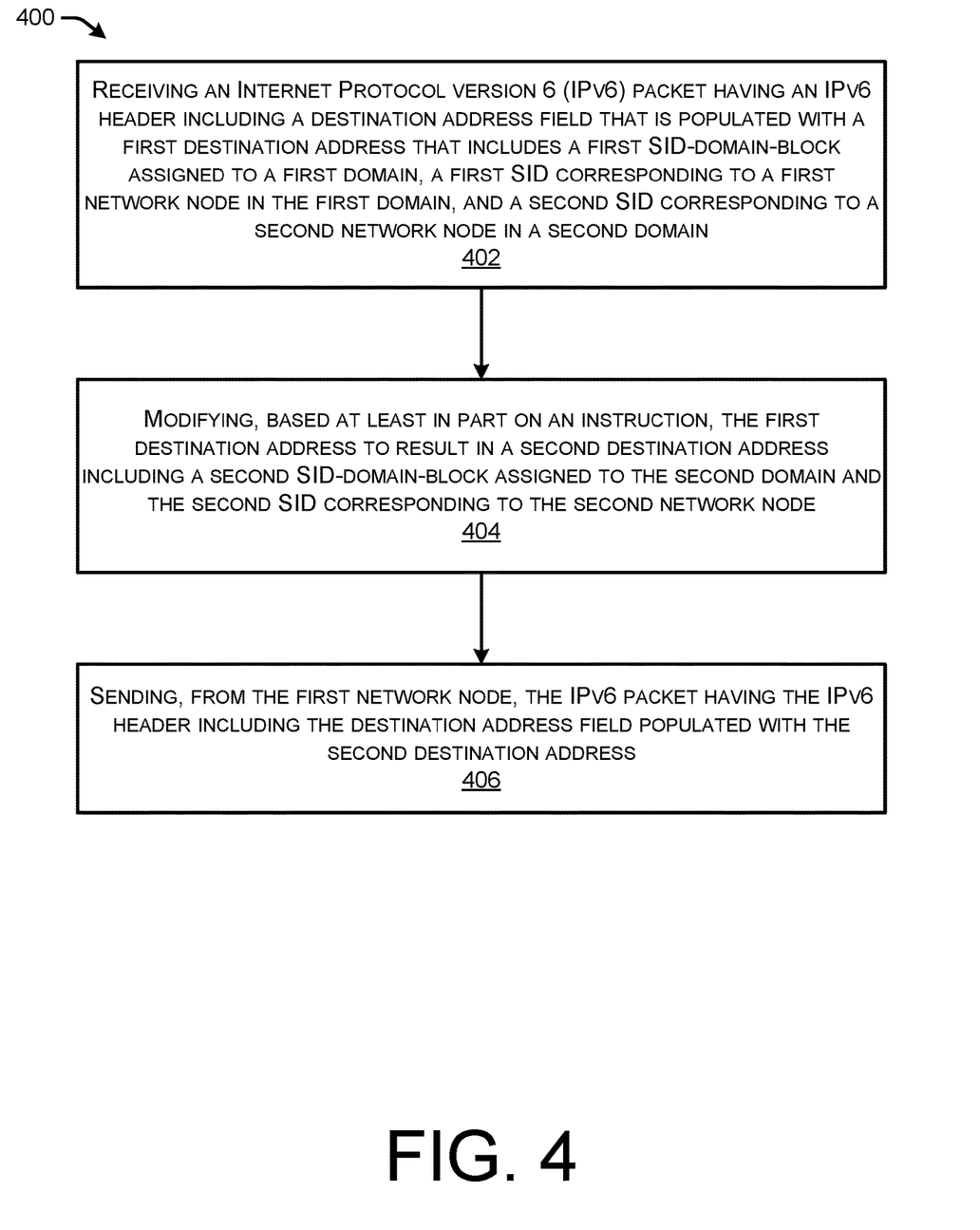
FIG. 4 illustrates a flow diagram of an example method for an intermediary node in a multi-domain network to receive an IPv6 packet, modify the destination address by replacing a current SID-domain-block with a destination SID-domain-block, and sending the IPv6 onto a node in a destination domain according to the SID-domain-block.
Figure 5:
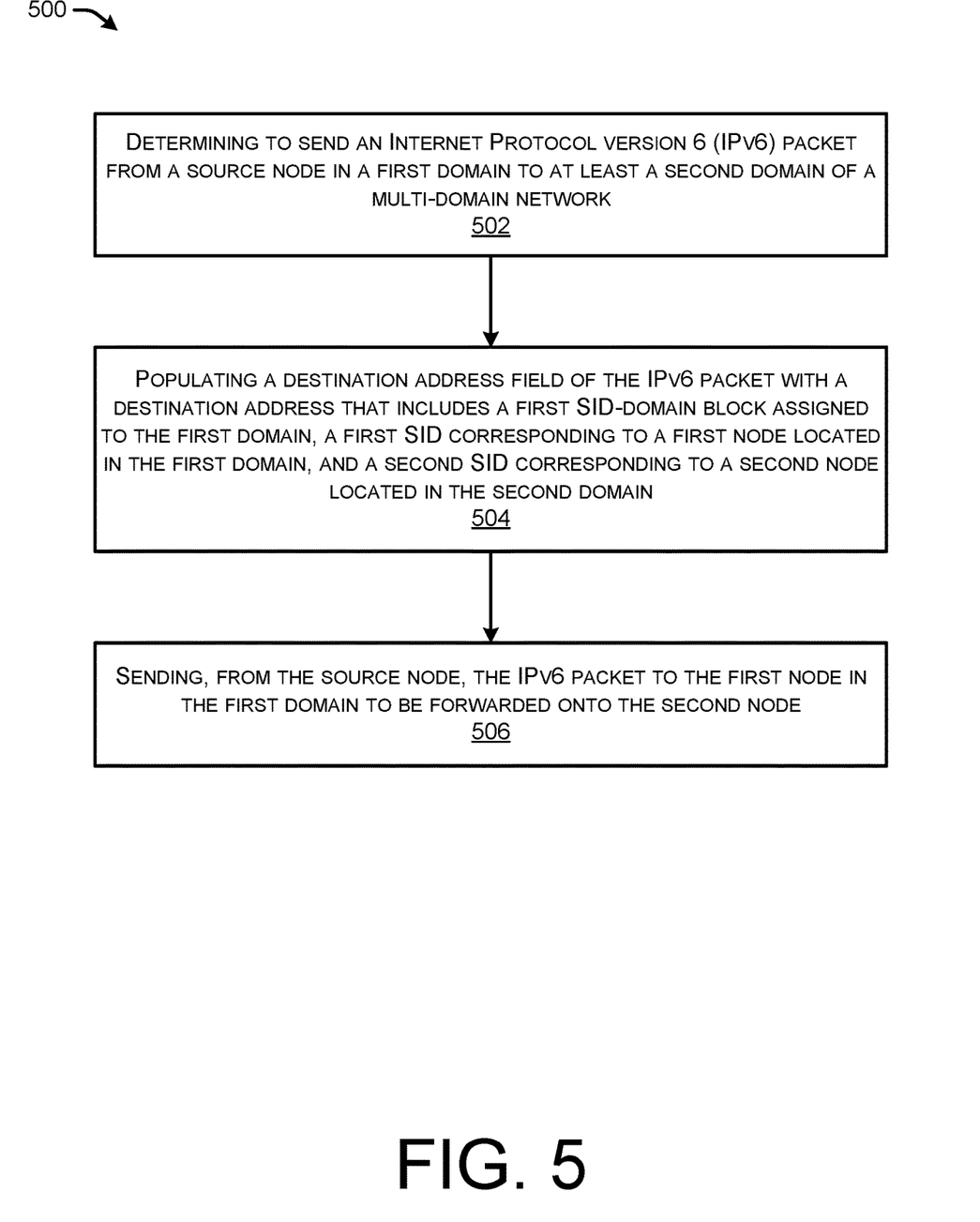
FIG. 5 illustrates a flow diagram of an example method for a source device in a multi-domain network to send an IPv6 packet using segment routing using a block swapping instruction to modify the SID-domain-blocks as the packet moves between the domains.

FIGS. 4 and 5 illustrate flow diagrams of example methods 400 and 500 that illustrate aspects of the functions performed at least partly by the devices in the multi-domain networks 102 as described in FIGS. 1-3. The logical operations described herein with respect to FIGS. 4 and 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, Application-Specific Integrated Circuit (ASIC), and any combination thereof. It should also be appreciated that more or fewer operations might be performed than shown in the FIGS. 4 and 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 4 illustrates a flow diagram of an example method 400 for an intermediary node in a multi-domain network to receive an IPv6 packet, modify the destination address by replacing a current SID-domain-block with a destination SID-domain-block, and sending the IPv6 onto a node in a destination domain according to the SID-domain-block. In some examples, the techniques of method 400 may be performed by a node (e.g., intermediary device 118(2), node "2" in anycast group 204(A), etc.) disposed in a first domain (e.g., domain 1 106) of a multi-domain network 102. In such examples, the node may comprise one or more hardware interfaces configured to send and receive packets in the multi-domain network, one or more processors, and one or more non-transitory computer-readable media storing computer-executable instructions that, when executed by the one or more processors, cause the one or more processors to perform steps of method 400.

At 402, the node may receive, by the one or more hardware interfaces, an Internet Protocol version 6 (IPv6) packet having an IPv6 header including a destination address field that is populated with a first destination address. In such examples, the first destination address includes a first segment identifier SID-domain-block assigned to the first domain, a first SID corresponding to the node. and a second SID associated with a target node located in a second domain of the multi-domain network. Further, in such examples the first SID is associated with an instruction to change the first SID-domain-block to a second SID-domain-block assigned to the second domain in which the target node is located.

At 404, the node may modify, based at least in part on the instruction, the first destination address to result in a second destination address. The second destination address may include the second SID-domain-block assigned to the second domain, and the second SID corresponding to the target node.

In some examples, modifying the first destination address to result in the second destination address includes replacing the first SID-domain-block with the second SID-domain-block, removing the first SID from the first destination address, the first SID having a defined bit length, and shifting the second SID by the defined bit length of the first SID. In some examples, the second SID-domain-block populates a most significant bit in the destination address field and the second SID is located adjacent the second SID-domain-block in the destination address field.

At 406, the node may send, by the one or more hardware interfaces, the IPv6 packet having the IPv6 header including the destination address field populated with the second destination address.

In some examples, the node may comprise a border node (e.g., node 118(2)) between the first domain (e.g., domain 1 106) and the second domain (e.g., domain 2 108). The node may further send an advertisement message 304 to one or more first nodes in the first domain, and the advertisement message may indicate the first SID-domain-block and the first SID associated with the instruction.

In some examples, the second SID comprises a prefix SID that includes an IP address prefix assigned to the target node, and sending the IPv6 packet comprises sending the IPv6 packet to the target node based at least in part on the prefix SID. In various examples, the second SID comprises an adjacency SID that indicates a link between the node and the target node, and to send the IPv6 packet comprises sending the IPv6 packet to the target node based at least in part on the adjacency SID.

In some instance, the first SID corresponds to an anycast group in which the node is included, and the node is indicated as having reachability to one or more nodes in the second domain.

FIG. 5 illustrates a flow diagram of an example method 500 for a source node 116 in a multi-domain network 102 to send an IPv6 packet 112 using segment routing using a block swapping instruction to modify the SID-domain-blocks as the packet moves between the domains.

At 502, the source node 116, which may be in a first domain 106 in a multi-domain network 102, may determine to send an Internet Protocol version 6 (IPv6) packet to at least a second domain of the multi-domain network. In some examples, the source node 116 may receive a request for access to an end service or application in another domain of the multi-domain network 102, and the source node 116 may determine a destination device 120 for the IPv6 packet 112 to be routed to.

At 504, the source node 116 may populate a destination address field of the IPv6 packet with a destination address. The destination address may include a first segment identifier SID-domain block assigned to the first domain, a first SID corresponding to a first node located in the first domain, and a second SID corresponding to a second node located in the second domain. In such examples, the first SID is associated with an instruction for the first node to change the first SID-domain-block to a second SID-domain-block assigned to the second domain in which the second node is located.

At 506, the source node 116 may send the IPv6 packet 112 to the first node in the first domain to be forwarded onto the second node. In some examples, the method 500 may further include receiving, from first node, an advertisement message indicating that at least one of the first node is a border node or the first node has reachability to the second domain. The advertisement message may further indicate a block swapping instruction, such as the first SID that is associated with the instruction for the first node to change the first SID-domain-block to a second SID-domain-block assigned to the second domain. In some instance, the first SID corresponds to an anycast group in which the first node is included.

In various examples, the first SID comprises a prefix SID that includes an IP address prefix assigned to the first node, and sending the IPv6 packet comprises sending the IPv6 packet to the first node based at least in part on the prefix SID. In various examples, the first SID comprises an adjacency SID that indicates a link between the source node and the first node, and sending the IPv6 packet comprises sending the IPv6 packet to the first node based at least in part on the adjacency SID.

In some instance, the destination address populated in the destination address field further comprises a third SID corresponding to a third node located in a third domain of the multi-domain network. In such examples, the third SID is associated with another instruction to change the second SID-domain-block to a third SID-domain-block assigned to the third domain in which the third node is located.

Figure 6:
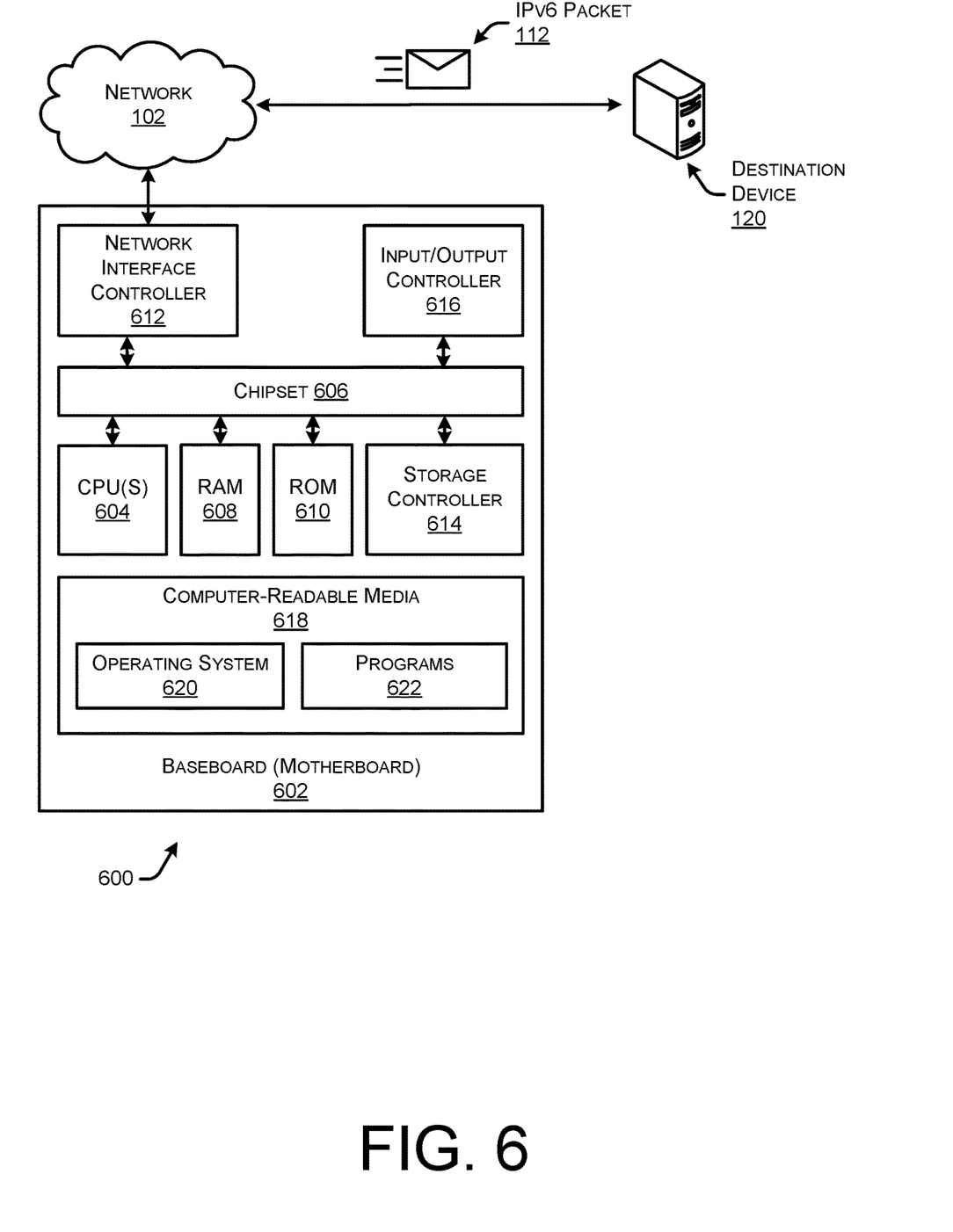
FIG. 6 is a computer architecture diagram showing an illustrative computer hardware architecture for implementing a routing device that can be utilized to implement aspects of the various technologies presented herein.

FIG. 6 shows an example computer architecture for a computer 600 capable of executing program components for implementing the functionality described above. The computer architecture shown in FIG. 6 illustrates a node in a multi-domain network 102 (e.g., source device 116, intermediary node 118, destination device 120) described herein, and may comprise networked devices such as servers, switches, routers, hubs, bridges, gateways, modems, repeaters, access points, etc. In some examples, however, the computer 600 may correspond to a conventional server computer, workstation, desktop computer, laptop, tablet, network appliance, e-reader, smartphone, or other computing device, and can be utilized to execute any of the software components presented herein.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 102. The chipset 606 can include functionality for providing network connectivity through a NIC 612, such as a gigabit Ethernet adapter. The NIC 612 is capable of connecting the computer 600 to other computing devices over the network 102. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the network 102, and or any components included therein, may be supported by one or more devices similar to computer 600. Stated otherwise, some or all of the operations performed by the network 102, and or any components included therein, may be performed by one or more computer devices 602 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

As described herein, the computer 600 may comprise one or more of a source device/node 116, an intermediary device/node 118, and/or a destination device/node 120. The computer 600 may include one or more hardware processors 604 (processors) configured to execute one or more stored instructions. The processor(s) 604 may comprise one or more cores. Further, the computer 600 may include one or more network interfaces configured to provide communications between the computer 600 and other devices, such as the communications described herein as being performed by the source device 116, intermediary device 118, and destination device 120. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, IP protocols, and any other communication protocol.

The programs 622 may comprise any type of programs or processes to perform the techniques described in this disclosure for routing packets through multi-domain networks 102 using domain-specific, micro-segment routing instructions (e.g., micro SIDs). For example, the programs 622 may cause the computer 600 to perform techniques for communicating with other devices using any type of protocol or standard usable for performing SRv6 using micro SIDs and swapping micro SID-domain-blocks for routing IPv6 packets 121 through multiple domains of a multi-domain network 102. Additionally, the programs 622 may comprise instructions that cause the computer 600 to perform the techniques for communicating data using various communication protocols described herein. Generally, the programs 622 may comprise one or more modules or components to perform any of the operations described herein by any of the different types of devices/nodes described herein. In some instances, the programs may run inside of virtual machines, containers, and/or other virtual resources types.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
receiving, by a first network node located in a first domain of a multi-domain network, an Internet Protocol version 6 (IPv6) packet having an IPv6 header including a destination address field that is populated with a first destination address, the first destination address including:
a first segment identifier (SID)-domain-block assigned to the first domain;
a first SID corresponding to the first network node; and
a second SID corresponding to a second network node located in a second domain of the multi-domain network,
wherein the first SID is associated with an instruction to change the first SID-domain-block to a second SID-domain-block assigned to the second domain in which the second network node is located;
modifying, by the first network node and based at least in part on the instruction, the modifying including replacing the first SID-domain-block with the second SID-domain-block, the first destination address to result in a second destination address, the second destination address including:
the second SID-domain-block assigned to the second domain; and
the second SID corresponding to the second network node; and
sending, from the first network node, the IPv6 packet having the IPv6 header including the destination address field populated with the second destination address.

2. The method of claim 1, wherein modifying the first destination address to result in the second destination address includes:
removing the first SID from the first destination address, the first SID having a defined bit length; and
shifting the second SID by the defined bit length of the first SID,
wherein the second SID-domain-block populates a particular bit in the destination address field and the second SID is located adjacent the second SID-domain-block in the destination address field.

3. The method of claim 1, wherein the first network node comprises a border node between the first domain and the second domain, further comprising at least one of:
sending, from the first network node, an advertisement message to one or more first network nodes in the first domain, the advertisement message indicating the first SID-domain-block and the first SID associated with the instruction.

4. The method of claim 1, wherein:
the second SID comprises a prefix SID that includes an IP address prefix assigned to the second network node; and
sending the IPv6 packet comprises sending the IPv6 packet to the second network node based at least in part on the prefix SID.

5. The method of claim 1, wherein:
the second SID comprises an adjacency SID that indicates a link between the first network node and the second network node; and
sending the IPv6 packet comprises sending the IPv6 packet to the second network node based at least in part on the adjacency SID.

6. The method of claim 1, wherein the first SID corresponds to an anycast group in which the first network node is included.

7. The method of claim 1, wherein the first network node is indicated as having reachability to one or more nodes in the second domain.

8. A node disposed in a first domain of a multi-domain network, the node comprising:
one or more hardware interfaces configured to send and receive packets in the multi-domain network;
one or more processors; and
one or more non-transitory computer-readable media storing computer-executable instructions that, when executed by the one or more processors, cause the one or more processors to:

receive, by the one or more hardware interfaces, an Internet Protocol version 6 (IPv6) packet having an IPv6 header including a destination address field that is populated with a first destination address, the first destination address including:
- a first segment identifier (SID)-domain-block assigned to the first domain;
- a first SID corresponding to the node; and
- a second SID associated with a target node located in a second domain of the multi-domain network,
- wherein the first SID is associated with an instruction to change the first SID-domain-block to a second SID-domain-block assigned to the second domain in which the target node is located;

modify, based at least in part on the instruction, the first destination address to result in a second destination address, wherein to modify the first destination address includes replacing the first SID-domain-block with the second SID-domain-block, the second destination address including:
- the second SID-domain-block assigned to the second domain; and
- the second SID corresponding to the target node; and send, by the one or more hardware interfaces, the IPv6 packet having the IPv6 header including the destination address field populated with the second destination address.

9. The node of claim 8, wherein to modify the first destination address to result in the second destination address includes:
- removing the first SID from the first destination address, the first SID having a defined bit length; and
- shifting the second SID by the defined bit length of the first SID,
- wherein the second SID-domain-block populates a particular bit in the destination address field and the second SID is located adjacent the second SID-domain-block in the destination address field.

10. The node of claim 8, wherein the node comprises a border node between the first domain and the second domain, comprising further computer-executable instructions that, when executed, cause the one or more processors to:
- send an advertisement message to one or more first nodes in the first domain, the advertisement message indicating the first SID-domain-block and the first SID associated with the instruction.

11. The node of claim 8, wherein:
- the second SID comprises a prefix SID that includes an IP address prefix assigned to the target node; and
- sending the IPv6 packet comprises sending the IPv6 packet to the target node based at least in part on the prefix SID.

12. The node of claim 8, wherein:
- the second SID comprises an adjacency SID that indicates a link between the node and the target node; and
- to send the IPv6 packet comprises sending the IPv6 packet to the target node based at least in part on the adjacency SID.

13. The node of claim 8, wherein the first SID corresponds to an anycast group in which the node is included.

14. The node of claim 8, wherein the node is indicated as having reachability to one or more nodes in the second domain.

15. A method comprising:
determining, by a source node in a first domain of a multi-domain network, to send an Internet Protocol version 6 (IPv6) packet to at least a second domain of the multi-domain network;
populating, by the source node, a destination address field of the IPv6 packet with a destination address, the destination address including:
- a first segment identifier (SID)-domain block assigned to the first domain;
- a first SID corresponding to a first node located in the first domain; and
- a second SID corresponding to a second node located in the second domain,
- wherein the first SID is associated with an instruction for the first node to replace the first SID-domain-block with a second SID-domain-block assigned to the second domain in which the second node is located; and sending, from the source node, the IPv6 packet to the first node in the first domain to be forwarded onto the second node.

16. The method of claim 15, further comprising:
- receiving, from first node, an advertisement message indicating that at least one of the first node is a border node or the first node has reachability to the second domain.

17. The method of claim 15, wherein the first SID corresponds to an anycast group in which the first node is included.

18. The method of claim 15, wherein
- the first SID comprises a prefix SID that includes an IP address prefix assigned to the first node; and
- sending the IPv6 packet comprises sending the IPv6 packet to the first node based at least in part on the prefix SID.

19. The method of claim 15, wherein:
- the first SID comprises an adjacency SID that indicates a link between the source node and the first node; and
- sending the IPv6 packet comprises sending the IPv6 packet to the first node based at least in part on the adjacency SID.

20. The method of claim 15, wherein the destination address populated in the destination address field further comprises:
- a third SID corresponding to a third node located in a third domain of the multi-domain network,
- wherein the third SID is associated with another instruction to change the second SID-domain-block to a third SID-domain-block assigned to the third domain in which the third node is located.

* * * * *